April 7, 1970 P. J. VAN GERWEN ET AL 3,505,607

ARRANGEMENT FOR SELECTING IN A CORRECT PHASE RELATIONSHIP A CHARACTERISTIC COMPONENT FROM A FREQUENCY SPECTRUM

Filed Nov. 14, 1967

INVENTORS
PETRUS J. VAN GERWEN
ROBERT J. SLUYTER
BY
[signature]
AGENT

United States Patent Office 3,505,607
Patented Apr. 7, 1970

3,505,607
ARRANGEMENT FOR SELECTING IN A CORRECT PHASE RELATIONSHIP A CHARACTERISTIC COMPONENT FROM A FREQUENCY SPECTRUM

Petrus Josephus van Gerwen and Robert Johannes Sluyter, Emmasingel, Eindhoven, Netherlands, assignors, by mesne assignments, to U.S. Philips Corporation, New York, N.Y., a corporation of Delaware Filed Nov. 14, 1967, Ser. No. 682,885
Claims priority, application Netherlands, Nov. 19, 1966, 6616319
Int. Cl. H03k *1/04*
U.S. Cl. 328—167 7 Claims

ABSTRACT OF THE DISCLOSURE

A selection filter for an oscillation occurring in a spectrum of oscillations is comprised of a main channel including a pair of modulators, a filter connected between the modulators, and a filter connected to the output of the last modulator. An auxiliary channel, which also includes a filter, is connected to the input of the main channel. Separate channels are provided for connecting the other input of each modulator to the output of the auxiliary channel.

The invention relates to an arrangement for selecting in correct phase relationship a characteristic component from a frequency spectrum, in which a selection channel is connected between input and output. Such arrangements are used in a wide technical field, for example, in data transmission, delta modulation, pulse code modulation, television and the like, for selection of a pilot signal or a synchronizing signal.

In practice, use is frequently made of a local oscillator which, for stabilization on the phase of the characteristic component, is included in a phase control circuit (AFC-loop). However, it has been found that practical difficulties arise, for example, variations in amplitude or in frequency of the characteristic component produce phase deviations in the output signal of the local oscillator, whilst when the selectivity is raised, the lock-in time may assume impermissibly high values, which is very disturbing, particularly after interruptions.

The invention has for an object to provide a different construction of an arrangement of the kind mentioned in the preamble which is not only simple and efficient but is also distinguished by the fact that the selectivity can be raised considerably without influencing the correct phase relationship by frequency and amplitude variations, while moreover disturbing delays in the selection are avoided.

The arrangement according to the invention is characterized in that an auxiliary channel provided with a selection member is connected to the input of the selection channel which includes a first and a second modulator and a selection filter disposed between these modulators, an input of the first and an input of the second modulator being connected through separate connecting channels to the auxiliary channel, whilst a selection filter for the characteristic component is connected to the output of the second modulator.

In order to obtain a selection in correct phase relationship, as a function of the relative detuning, the phase characteristic of the part of the selection channel located outside the modulators is substantially equal to the difference between the phase characteristic of the selection filter disposed between the modulators and the difference phase characteristic of the connecting channels leading to the modulators, which difference phase characteristic is formed by the phase characteristic of the connecting channel to the second modulator minus the phase characteristic of the connecting channel to the first modulator.

The invention will now be described more fully with reference to the figures.

Figures 1, 2, 3:
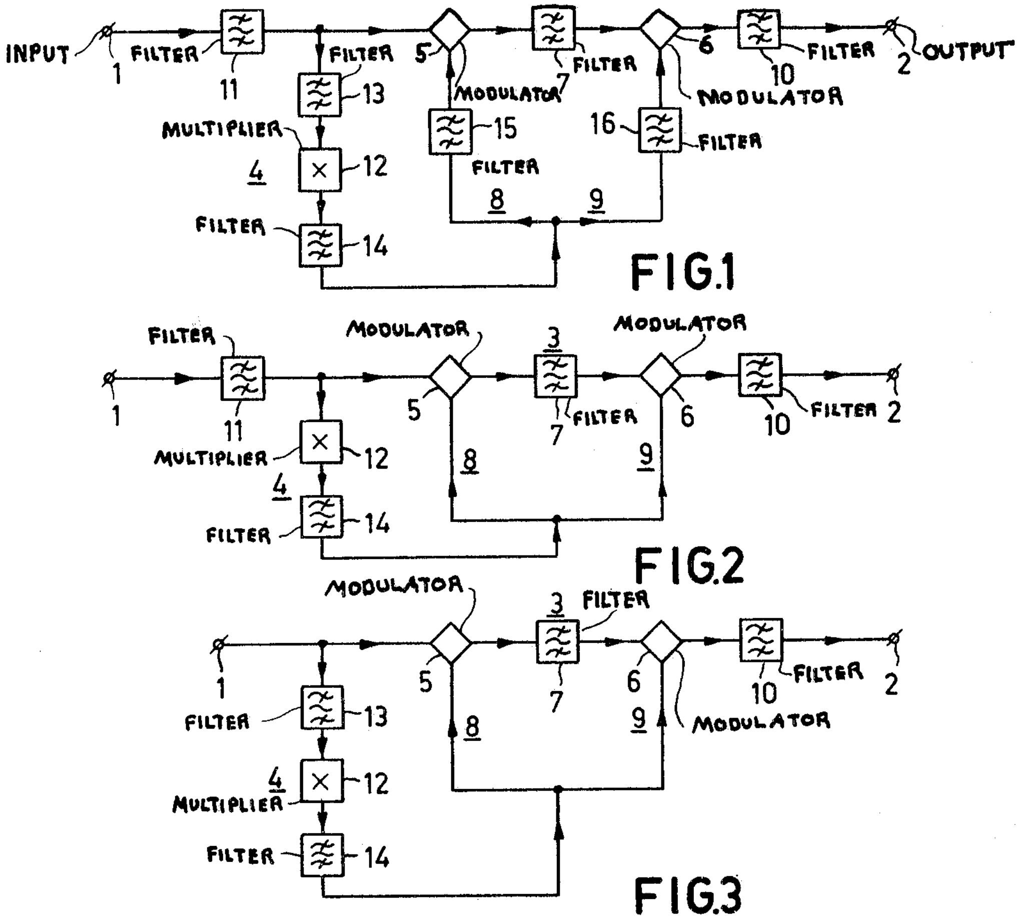
FIGURE 1 shows an arrangement according to the invention.
FIGURE 2 shows a favourable practical embodiment of an arrangement according to the invention.
FIGURE 3 shows an alternative embodiment of the arrangement of FIGURE 2.

The arrangement shown in FIGURE 1 includes a selection channel 3 connected between an input 1 and an output 2 for selecting in correct phase relationsip from a frequency spectrum supplied a pilot signal having a nominal frequency of, for example, 1800 c./s. This arrangement more particularly has for its obect to apply to the output 2 a selected pilot signal which—despite any frequency—or amplitude variations in the pilot signal at the input 1—is practically free from the phase variations invariably introduced by a selection process so that the pilot signal at the output 2 is substantially in phase with the pilot signal at the input 1.

For this purpose, in the arrangement according to the invention, an auxiliary channel 4 provided with a selection member is connected to the input 1 of the selection channel 3 which includes a first modulator 5, a second modulator 6 and a selection filter 7 disposed between these modulators 5, 6, an input of the first modulator 5 and an input of the second modulator 6 being connected through separate connecting channels 8 and 9, respectively, to the auxiliary channel 4, whilst a selection filter 10 for the pilot signal is connected to the output of the second modulator 6.

In the embodiment shown in FIGURE 1, a selection filter 11 common to the selection channel 3 and the auxiliary channel 4 is connected to the input 1. The auxiliary channel 4 is provided with a frequency multiplier 12 having an input filter 13 and an output filter 14 tuned to the multiplied frequency, whilst each of the connecting channels 8 and 9 includes a filter 15 and 16, respectively.

In order to obtain phase equality between the pilot signal at the output 2 and that at the input 1, as a function of the relative detuning, the phase characteristic of the part of the selection channel 3 located outside the modulators 5, 6 (i.e. in FIGURE 1 of the series combination of the selection filters 11 and 10) is substantially equal to the difference between the phase characteristic of the selection filter 7 disposed between the modulators 5, 6 and the difference phase characteristic of the connecting channels 8, 9, leading to the modulators 5, 6 which difference phase characteristic is formed by the phase characteristic of the filter 16 minus the phase characteristic of the filter 15.

The operation of the arrangement shown in FIGURE 1 will be explained hereinafter.

When a pilot signal having a frequency $\omega$ is supplied to the input 1, which is represented by:

$$\cos \omega t \qquad (1)$$

this pilot signal, when passing through the selection filter 11, which is tuned to the nominal frequency $\omega_0$ of the pilot signal ($\omega_0=2\pi 1800$ rad./sec.), is shifted in phase by $\phi_1$ in accordance with the relative detuning $$v=\frac{\omega}{\omega_0}-\frac{\omega_0}{\omega}$$

of the pilot signal with respect to the tuning frequency $\omega_0$ so that the pilot signal at the output of selection filter 11 can be represented by:

$$\cos(\omega t+\phi_1) \quad (2)$$

This signal (2) is applied to the modulator 5 and to the frequency multiplier 12 through the input filter 13 which is also tuned to the frequency $\omega_0$ and in which this signal is shifted in phase by $\alpha_1$ due to the relative detuning, so that the input signal for the frequency multiplier 12 is given by:

$$\cos(\omega t+\phi_1+\alpha_1) \quad (3)$$

When the frequency multiplier is adjusted to a multiplication factor $n$, a frequency-multiplied pilot signal appears at its output which has a frequency $n\omega$ and which has the form:

$$\cos(n\omega t+n\phi_1+n\alpha_1) \quad (4)$$

which is filtered out by an output filter 14 tuned to the frequency $n\omega_0$ whilst due to the relative detuning the signal (4) is shifted in phase by $\alpha_2$ so that a signal appears at the input of the connecting channel 8 which has the form:

$$\cos(n\omega t+n\phi_1+n\alpha_1+\alpha_2) \quad (5)$$

The signal (5) is applied through the connecting channel 8 including the filter 15 which is likewise tuned to the frequency $n\omega_0$ and in which due to the relative detuning the signal is shifted in phase by $\theta_1$, as a carrier signal of the form:

$$\cos(n\omega t+n\phi_1+n\alpha_1+\alpha_2+\theta_1) \quad (6)$$

to the modulator 5 and mixed therein with the output signal $\cos(\omega t+\phi_1)$ of the selection filter 11, the sum frequency $(n+1)\omega$ and the difference frequency $(n-1)\omega$ then being produced.

If, for example, the selection filter 7 at the output of modulator 5 is tuned to the frequency $(n+1)\omega_0$, the sum frequency $(n+1)\omega$ is filtered out by this selection filter and due to its relative detuning with respect to the tuning frequency $(n+1)\omega_0$ is shifted in phase by $\theta_2$ so that it appears at the output of the selection filter 7 in the form:

$$\cos\{(n+1)\omega t+(n+1)\phi_1+n\alpha_1+\alpha_2+\theta_1+\theta_2\} \quad (7)$$

This signal (7) is remixed in the modulator 6 with a carrier wave which also originates from the frequency multiplier 12 and which, when passing through the filter 16 in the connecting channel 9 tuned to the frequency $n\omega_0$, due to the relative detuning is shifted in phase by $\theta_3$:

$$\cos\{(n\omega t+n\phi_1+n\alpha_1+\alpha_2+\theta_3\} \quad (8)$$

After remixing, a signal of the original frequency $\omega$ appears at the output of the modulator 6 which is represented by:

$$\cos(\omega t+\phi_1+\theta_1+\theta_2-\theta_3) \quad (9)$$

and which is filtered out by the selection filter 10 tuned to the nominal frequency $\omega_0$, a phase shift $\phi_2$ being produced in this signal (9) due to the relative detuning so that a selected pilot signal appears at the output 2 which has the form:

$$\cos(\omega t+\phi_1+\phi_2+\theta_1+\theta_2-\theta_3) \quad (10)$$

On the one hand, it appears from this Formula 10 that the phase shift $n\alpha_1+\alpha_2$ produced in the auxiliary channel 4 by input filter 13 and output filter 14 of frequency multiplier 12 does not appear in the pilot signal derived from the output 2 so that no special requirements need be imposed on the filters 13, 14 in the auxiliary channel 4. It appears on the other hand that this pilot signal has shifted in phase due to the selection process over an amount which is represented by:

$$\phi_1+\phi_2+\theta_1+\theta_2-\theta_3 \quad (11)$$

$\phi_1$ and $\phi_2$ represent the phase shifts in the selection filters 11 and 10, respectively, tuned to the frequency $\omega_0$ resulting from the relative detuning when a frequency $\omega$ is supplied;

$\theta_1$ and $\theta_3$ represent the phase shifts in the filters 15 and 16 in the connection channels 8 and 9, respectively, tuned to the frequency $n\omega_0$ resulting from the relative detuning when a frequency $n\omega$ is supplied;

$\theta_2$ represents the phase shift in the selection filter 7 tuned to the frequency $(n+1)\omega_0$ resulting from the relative detuning when a frequency $(n+1)\omega$ is supplied.

In the arrangement shown, it is achieved by the steps in accordance with the invention that the relative detuning in the relevant filters 7, 10, 11, 15, 16 with respect to their tuning frequency is invariably the same, since each time a frequency $k\omega$ is applied to a filter tuned to the frequency $k\omega_0$ so that each time:

$$v=\frac{k\omega}{k\omega_0}-\frac{k\omega_0}{k\omega}=\frac{\omega}{\omega_0}-\frac{\omega_0}{\omega}$$

If, as already stated, it is ensured that as a function of the relative detuning, the phase characteristic of the series-combination of the selection filters 11 and 10 is equal to the difference between the phase characteristic of filter 15 minus the phase characteristic of filter 16 and the phase characteristic of the selection filter 1; it is guaranteed for arbitrary values of the pilot signal frequency $\omega$ that:

$$\phi_1+\phi_2=(\theta_3-\theta_1)-\theta_2 \quad (12)$$

or:

$$\phi_1+\phi_2+\theta_1+\theta_2-\theta_3=0 \quad (13)$$

so that the selected pilot signal at the output 2, independently of frequency variations at the input 1, invariably has the same frequency and the same phase as the pilot signal at the input 1. For it appears from Formula 13 that it is invariably ensured that, independently of any frequency variations in the pilot signal at the input 1, the sum of the phase shifts $\phi_1$, $\theta_2$, $\phi_2$ in the respective selection filter 11, 7, 10 and the phase shift $\theta_1$ in the filter 15 is compensated by the phase shift $\theta_3$ in the filter 16.

The filter 15 can be omitted without adversely affecting the selection process by the selection filters 11, 7, 10 and whilst retaining the phase compensation, in which event for the phase compensation the relation:

$$\phi_1+\phi_2+\theta_2-\theta_3=0 \quad (14)$$

must be fulfilled, that is to say that the sum of the phase shifts $\phi_1$, $\theta_2$, $\phi_2$ in the respective selection filters 11, 7, 10 is compensated in this case by the phase shift $\theta_3$ in the filter 16. Thus, the selection of a pilot signal without phase errors requires beside the selection filters 11, 7, 10 only one additional filter in the form of the filter 16 in the connected channel 9 to the modulator 6.

In the arrangement according to the invention, the pilot signal may be selected in correct phase relationship even without the use of additional filters. More particularly, instead of the sum frequency $(n+1)\omega$ the difference frequency $(n-1)\omega$ should be filtered out by tuning the selection filter 7 to the frequency $(n-1)\omega_0$, in which event it may be derived in quite the same manner as described above that for the phase compensation the relation:

$$\phi_1+\phi_2=\theta_2-(\theta_3-\theta_1) \quad (15)$$

or:

$$\phi_1+\phi_2-\theta_1-\theta_2+\theta_3=0 \quad (16)$$

must be fulfilled, in which relation the magnitudes $\phi_1$, $\phi_2$, $\theta_1$, $\theta_3$ have the same meaning as in the foregoing, whilst $\theta_2$ represents the phase shift in the selection filter 7 tuned to the frequency $(n-1)\omega_0$ resulting from the relative detuning when a frequency $(n-1)\omega$ is supplied.

The two filters 15, 16 in the connecting channels 8, 9 may be omitted, in which event the relation $$\phi_1+\phi_2-\theta_2=0 \quad (17)$$

follows from the Formula 16, that is to say that the sum of the phase shifts $\phi_1$, $\phi_2$ in the respective selection filters 11, 10 is compensated by the phase shift $\theta_2$ in the selection filter 7. The filter 7 acts not only as selection filter but also as phase compensator.

FIGURE 2 shows the circuit diagram of a particularly favourable practical embodiment of an arrangement according to the invention, in which elements corresponding to those of FIGURE 1 are denoted by the same reference numerals.

In this arrangement, the selection filters 11 and 10 are constituted by single resonance circuits which are tuned to the frequency $\omega_0$ and which have equal quality factors Q. When passing through such a single resonance circuit, a pilot signal having a frequency $\omega$ is shifted in phase by $\phi$, which is represented by:

$$\phi = \text{arctg}\ (-\nu Q) \qquad (18)$$

so that it holds for the sum of the phase shifts $\phi_1$, $\phi_2$ in the selection filters 11 and 10:

$$\phi_1 + \phi_2 = 2\ \text{arctg}\ (-\nu Q) \qquad (19)$$

In order to ensure a selection in correct phase relationship of the pilot signal, in accordance with Formula 17 the phase shift $\theta_2$ in the selection filter 7 should satisfy the relation:

$$\theta_2 = \phi_1 + \phi_2 = 2\ \text{arctg}\ (-\nu Q) \qquad (20)$$

which can be achieved in a simple manner by a selection filter 7 comprising two sections each of which has the form of a single resonance circuit tuned to the frequency $(n-1)\omega_0$ and also having a quality factor Q, this single resonance circuit also producing a phase shift $\phi$ given by Formula 18, since the relative detuning is equal to that for the selection filters 11 and 10.

Thus, an accurate phase equality is obtained between the pilot signals at the output 2 and at the input 1 without the use of additional filters, whilst moreover the filters 11, 7, 10 disposed in the selection channel 3 all contribute to the selection of the pilot signal. More particularly, the selectivity for the pilot signal of the arrangement of FIGURE 2 is equal to that of the series-combination of the filters 11, 7, 10 if they should all be tuned to one frequency $\omega_0$.

Not only can the selectivity be raised arbitrarily without influencing the correct phase relationship of the selection, but the arrangement shown in also distinguished by its very simple construction; more particularly, when compared with FIGURE 1, the filters 15, 16 in the connecting channels 8, 9 to the modulators 5, 6 and the input filter 13 of the frequency multiplier 12 are economized; for the function of the input filter 13 is fulfilled in this case by the selection filter 11. Moreover, no special requirements need be imposed on the component parts; for example, the modulators 5 and 6 may be simple switching modulators, whilst the arrangements shown further have the great practical advantage that phase variations in the various filters resulting from temperature variations are compensated substantially by each other.

FIGURE 3 shows an alternative embodiment of the arrangement of FIGURE 2 which may be used advantageously under certain conditions.

In this arrangement, the selection filter 11 common to the selection channel 3 and the auxiliary channel 4 is omitted so that the pilot signal is selected by only two filters 7 and 10. Instead of the selection filter 11, the auxiliary channel 4 includes the input filter 13 of the frequency multiplier 12; however, as already stated above, practicaly no requirements need be imposed on the construction of this filter 13.

This arrangement further operates in quite the same manner as the arrangement of FIGURE 2.

Figure 4:
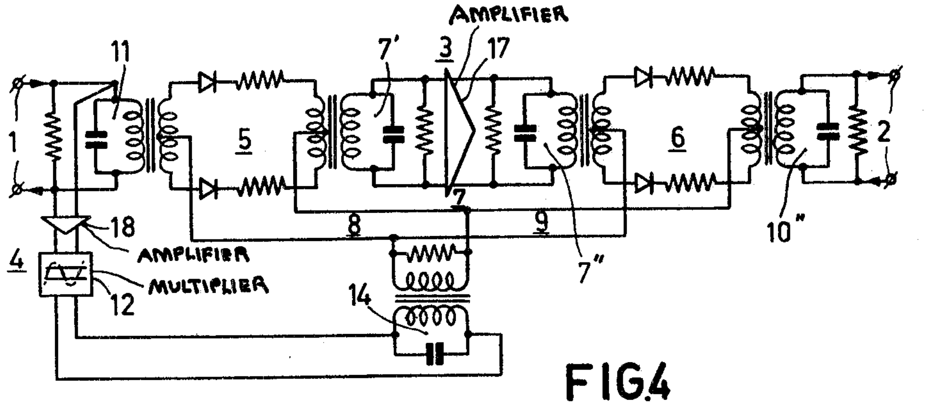
FIGURE 4 shows in greater detail the arrangement of FIGURE 2.

In order to illustrate the extremely simple construction of the arrangement according to the invention, FIGURE 4 shows the detail diagram of the arrangement of FIGURE 2.

In this figure, all the selection filters 11, 7, 10 in the selection channel 3 are composed of tuned single resonance circuits, whilst an isolation amplifier 17 is provided for decoupling the two sections 7′ and 7″ of the selection filter 7 and the modulators 5, 6 are constructed as push-pull modulators on which no special requirements need be imposed. To the input terminals 1 is also connected through the selection filter 11 the auxiliary channel 4 which includes an amplifier 18 followed by a frequency multiplier 12 in the form of a limiter having an output filter 14 which is connected to the carrier input of the modulators 5, 6. By way of example, in this embodiment, the output filter 14 is tuned to the third harmonic of the pilot signal frequency, whilst the selection filter 7 comprising the sections 7′ and 7″ is tuned to the second harmonic of the pilot signal frequency.

When a pilot signal at the output terminals 2 is applied to the input terminals 1, the selected pilot signal will be obtained in quite the same manner as described with reference to FIGURE 2, which selected pilot signal will be invariably in phase with the pilot signal at the input terminals 1.

It should be noted that the arrangement according to the invention may also be of different construction. For due to the fact that no special requirements need be imposed on the auxiliary channel 4, there is a great freedom in the construction of the auxiliary channel 4; for example, a frequency divider may be connected in cascade arrangement with the frequency multiplier 12 or the frequency multiplier 12 may even be omitted. However, in practice, the use of a frequency multiplier in the auxiliary channel 4 is strongly preferred, inter alia with a view to the construction of the selection filters, as has been set out with reference to FIGURE 2.

What is claimed is:

1. An arrangement for selecting in correct phase relationship a characteristic component from a frequency spectrum, of the type in which a selection channel is connected between an input circuit and an output circuit, comprising an auxiliary channel having a selection member and connected to the input of the selection channel, said selection channel comprising a first and a second modulator and a selection filter disposed between said modulators, an input of each of said first and second modulators being connected through separate connecting channels to the output of said auxiliary channel, and a selection filter for the characteristic component connected between the output of the second modulator and said output circuit.

2. An arrangement as claimed in claim 1, characterized in that as a function of the relative detuning the phase characteristic of the part of the selection channel located outside the modulators is substantially equal to the difference between the phase characteristic of the selection filter disposed between the modulators and the difference phase characteristic of the connecting channels leading to the modulators, which difference phase characteristic is formed by the phase characteristic of the connecting channel to the second modulator minus the phase characteristic of the connecting channel to the first modulator.

3. An arrangement as claimed in claim 1, characterized in that the auxiliary channel includes a frequency multiplier.

4. An arrangement as claimed in claim 1, characterized in that the selection filter disposed between the modulators is tuned to the sum frequency of the frequencies applied to the first modulator and in that the connecting channel to the second modulator includes a filter.

5. An arrangement as claimed in claim 1, characterized in that the selection filter disposed between the modulators is tuned to the difference frequency of the frequencies applied to the first modulator and in that the auxiliary channel is directly connected to the carrier input of the two modulators.

6. An arrangement as claimed in claim 1 characterized in that the filters are constructed with resonance circuits of the same quality.

7. A circuit for selecting a given oscillation from a spectrum of oscillations, comprising an input terminal, a source of said spectrum of oscillations connected to said input terminal, first and second modulators each having first and second input circuits and an output circuit, means connecting the first input circuit of said first modulator to said input terminal, first selection filter means connected between the output circuit of said first modulator and the first input circuit of said second modulator, second selection filter means connecting the output circuit of said second modulator to said output terminal, an auxiliary channel, means applying oscillations at said first input circuit of said first modulator to said auxiliary channel, and means applying the output of said auxiliary channel to the second input circuits of said first and second modulators, said auxiliary channel comprising third selection filter means, whereby the phase relationship between said given oscillations at said input and output terminals is substantially independent of variation in the frequency of said given oscillations.

References Cited

UNITED STATES PATENTS

| | | | |
|---|---|---|---|
| 1,964,522 | 6/1934 | Lewis. | |
| 2,472,798 | 6/1949 | Fredendall. | |
| 3,307,408 | 3/1967 | Thomas et al. ______ | 328—167 X |
| 3,361,976 | 1/1968 | Konion _____________ | 325—421 |

DONALD D. FORRER, Primary Examiner

R. C. WOODBRIDGE, Assistant Examiner

U.S. Cl. X.R

325—431; 332—22; 333—70